United States Patent [19]
Oogiri et al.

[11] Patent Number: 5,581,367
[45] Date of Patent: Dec. 3, 1996

[54] FACSIMILE APPARATUS HAVING ENVIRONMENTAL CONDITION SENSOR

[75] Inventors: Tadakazu Oogiri; Kohichi Yasuda; Hiroki Morishita; Shigeki Hayashi; Hiroyuki Ueda; Naoyuki Ishida; Shinichi Kotera; Yasuhiko Moriuchi, all of Osaka, Japan

[73] Assignee: Mita Industrial Co., Ltd., Osaka, Japan

[21] Appl. No.: 290,282

[22] Filed: Aug. 8, 1994

[30] Foreign Application Priority Data

Aug. 24, 1993 [JP] Japan .................................. 5-209187

[51] Int. Cl.[6] ...................................................... H04N 1/00
[52] U.S. Cl. ........................ 358/404; 358/406; 358/437; 358/441
[58] Field of Search ...................................... 358/400, 406, 358/441, 442, 444, 437, 404, 468; 355/201–208, 246; 395/113, 114, 115; H04N 1/00

[56] References Cited

U.S. PATENT DOCUMENTS

| | | | |
|---|---|---|---|
| 4,970,599 | 11/1990 | Nobuta . | |
| 5,103,318 | 4/1992 | Takaoka | 358/437 |
| 5,146,273 | 9/1992 | Yamada | 355/206 |
| 5,204,718 | 4/1993 | Morita | 355/208 |
| 5,270,783 | 12/1993 | Bisaiji et al. | 355/208 |

FOREIGN PATENT DOCUMENTS

| | | |
|---|---|---|
| 0415754A1 | 3/1991 | European Pat. Off. . |
| 2166619 | 5/1986 | United Kingdom . |

OTHER PUBLICATIONS

Patent Abstracts of Japan, vol. 14, No. 200 (E–920) Apr. 24, 1990 & JP–A–02 041 069, Feb. 9, 1990.

*Primary Examiner*—Kim Vu
*Attorney, Agent, or Firm*—Beveridge, DeGrandi, Weilacher & Young, LLP

[57] ABSTRACT

A facsimile apparatus, which receives image information and records the information on a paper sheet, features a device for recording received image information, a storing device for storing received information and an environmental condition detecting device for detecting environmental conditions in the vicinity of the facsimile apparatus. The facsimile apparatus also includes a control unit for preventing the recording device from recording the received information on a paper sheet, and instead causing the storing device to store the received image information in response to the environmental condition detecting device detecting an unsuitable environmental condition. The control unit also causes the recording device to record the image information, which has been stored in the storing device under the environmental condition unsuitable for the recording operation, in response to the environmental condition detecting device subsequently detecting environmental conditions suitable for the recording operation by the recording device.

8 Claims, 2 Drawing Sheets

FACSIMILE APPARATUS HAVING ENVIRONMENTAL CONDITION SENSOR

BACKGROUND OF THE INVENTION

FIELD OF THE INVENTION

The present invention relates to a facsimile apparatus.

DESCRIPTION OF THE PRIOR ART AND BACKGROUND DISCUSSION

A facsimile apparatus is an apparatus for transmitting and receiving an image on a document or the like, and comprises a document reading section for reading the document to be transmitted, a recording section for recording the received image, and a control section for controlling operations of respective sections of the facsimile apparatus. Conventionally, a thermo-sensitive recording system has been widely employed for the recording section for recording the received image. In recent years, however, an electrostatic recording system for recording an image in accordance with an electrophotographic process has been employed. The electrostatic recording system is a recording system for writing an electrostatic latent image corresponding to a received image into a photoreceptor, developing the electrostatic latent image into a toner image, and transferring and fixing the toner image on paper sheets.

For example, if there occur problems such as a problem that paper sheets are run out of in the recording section, it is impossible to record the received image, resulting in a state where receiving is impossible. In order to solve the problem, therefore, the facsimile apparatus may, in some cases, have a so-called representing receiving function. The representing receiving function is a function of storing the received image in a memory provided for the facsimile apparatus in cases such as a case where any problem occurs in the recording section. The received image received by the representing receiving function and stored in the memory is read out at the time point where the function of the recording section is restored and is recorded on the paper sheets.

An operation ensuring environment range is generally defined in the facsimile apparatus. The operation ensuring environment range is a range of environmental conditions such as "temperatures of 10° C. to 32.5° C. and humidity of 20% to 80%". If the facsimile is used outside the operation ensuring environment range, mechanical troubles and degradation of the quality of the recorded image may occur.

For example, if the facsimile apparatus is caused to perform a recording operation under high humidity, a paper jam due to moisture absorption of the paper sheets may occur. In addition, if the facsimile is caused to perform a recording operation under cryogenic temperatures, a gear made of resin in a paper conveying mechanism may be cracked. Further, particularly in the facsimile apparatus comprising the recording section using the electrostatic recording system, the quality of the recorded image may be considerably degraded outside the operation ensuring environment range. This is caused by condensation of toner, moisture absorption of the paper sheets and temperature change in sensitivity of the photoreceptor.

If the facsimile apparatus is thus caused to perform a recording operation under environmental conditions outside the operation ensuring environment range of the facsimile, it is expected that various troubles may occur. Nevertheless, the conventionally used facsimile apparatus is so constructed that a recording operation is always performed in a time period during which the power supply is turned on. That is, if the power supply is turned on, a receiving operation is performed irrespective of the environmental conditions, so that the received image is recorded on the paper sheets.

The environmental conditions of a place where the facsimile apparatus is disposed are not always within the operation ensuring environment range. More specifically, when a room where the facsimile apparatus is disposed is not air-conditioned, for example, at night or during vacation, the environmental conditions of the place where the facsimile apparatus is disposed may be outside the operation ensuring environment range. Since the facsimile apparatus is generally in a state where a receiving operation is possible, the power supply being turned on, even at night or during vacation, however, a receiving operation and a recording operation are performed under the environmental conditions outside the operation ensuring environment range. Consequently, mechanical troubles may occur and the quality of the received image recorded may be considerably degraded, so that there is a possibility that an object of information transmission cannot be attained.

SUMMARY OF THE INVENTION

Therefore, an object of the present invention is to solve the above described technical subject and to provide a facsimile apparatus so adapted as to inhibit a recording operation under environmental conditions outside an operation ensuring environment range to allow reliable information transmission.

A facsimile apparatus in the present invention comprises an environmental condition detecting sensor or the like for detecting surrounding environmental conditions. The surrounding environmental conditions of the facsimile apparatus are detected by the environmental condition sensor. When the surrounding environmental conditions are outside the operation ensuring environment range, the received image information is stored into the storing means, so that the recording operation on paper sheets or the like is inhibited. Consequently, it is possible to prevent mechanical troubles and recording of an image inferior in quality on the paper sheets.

According to a desirable aspect of the present invention, the received image information stored in the storing means is recorded on the paper sheets when the environmental conditions detected by the environmental condition detecting sensor come within the operation ensuring environment range. As a result, it is possible to record good received image information on the paper sheets and make reliable information transmission.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
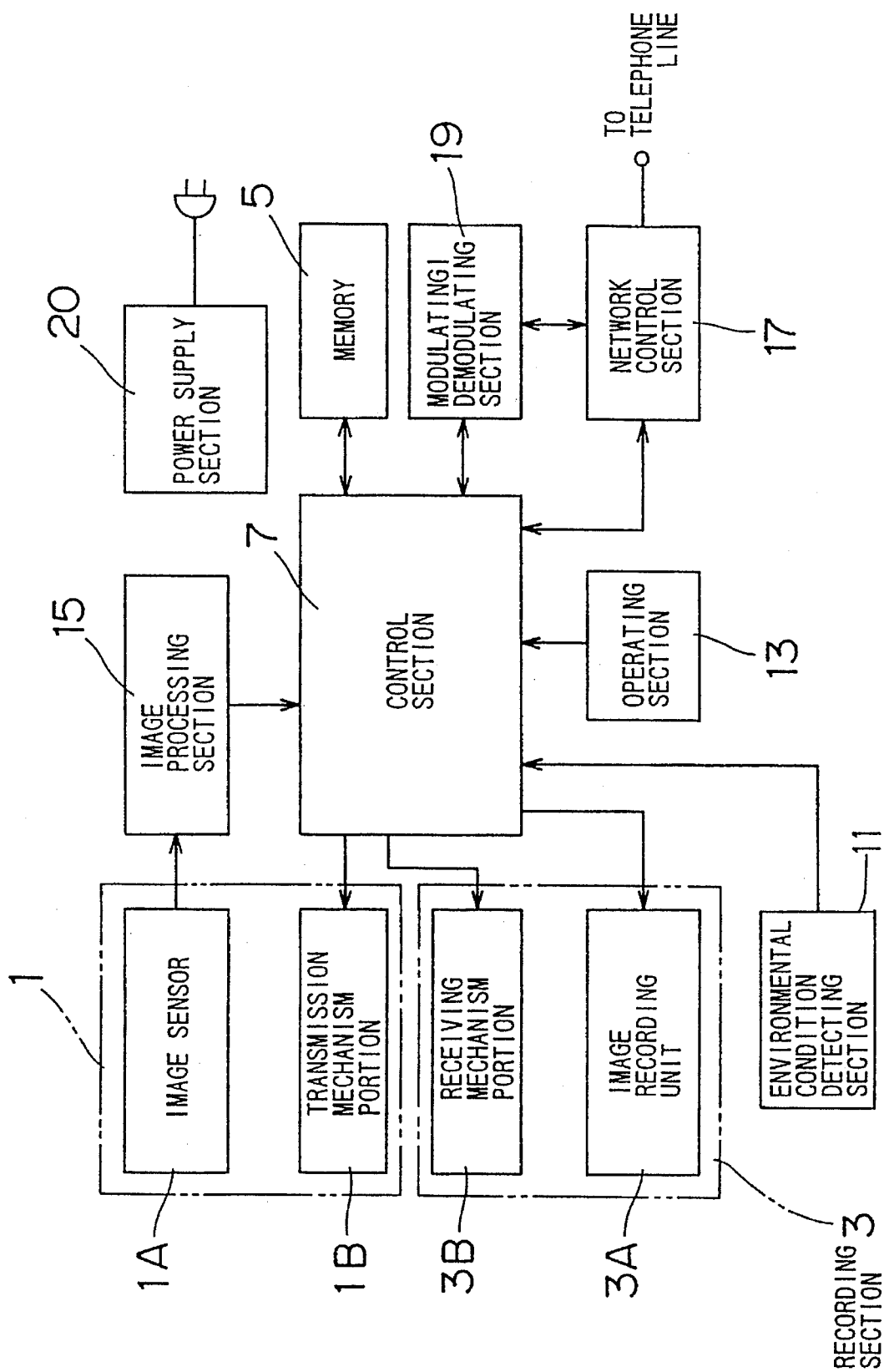
FIG. 1 is a block diagram showing the construction of a facsimile apparatus according to one embodiment of the present invention.

FIG. 1 is a block diagram showing the electrical construction of a facsimile according to one embodiment of the present invention. The facsimile comprises a reading section 1 for optically reading a document, a recording section 3 for recording image information received through a telephone line on paper sheets, a memory 5 serving as storing means capable of storing the received image information, and a control section 7 for controlling operations of respective sections of the facsimile apparatus and functioning as receiving means, judging means and control means. An environmental condition detecting section 11 for detecting environmental conditions in the vicinity of the recording section 3, an operating section 13 for inputting a facsimile number and an operation mode of a facsimile apparatus on the other side of communication, an image processing section 15 for processing an output signal of the reading section 1 to produce image information composed of binary-coded data, a network control section 17 connected to the telephone line, and a modulating/demodulating section 19 for modulating a transmission code and demodulating a receiving signal are further connected to the control section 7. Reference numeral 20 denotes a power supply section for supplying operating power to the respective sections of the facsimile, which is connected to a commercial AC power supply.

The reading section 1 comprises an image sensor 1A for detecting an optical image of the document and converting the same into an electric signal and a transmission mechanism portion 1B for conveying the document. At the time of transmission, the document is conveyed by the transmission mechanism portion 1B, while being optically read by the image sensor 1A. An output signal of the image sensor 1A is processed in the image processing section 15, thereby to produce image information. The image information is applied to the control section 7. In the control section 7, the image information is subjected to predetermined compression coding processing. A transmission code obtained by the compression coding processing is modulated in the modulating/demodulating section 19 and then, is sent out to the telephone line from the network control section 17.

The recording section 3 has an image recording unit 3A and a receiving mechanism portion 3B for conveying the paper sheets. The image recording unit 3A is for, for example, recording an image in accordance with an electrophotographic process. Specifically, the image recording unit 3A comprises a photoreceptor, a discharger for uniformly charging the surface of the photoreceptor, a light source for exposure for irradiating the charged surface of the photoreceptor by light to form an electrostatic latent image, a developing device for developing the electrostatic latent image into a toner image, a transferring unit for transferring the toner image on the paper sheets, and a fixing device for fixing on the paper sheets the toner image transferred on the paper sheets. A laser scanning unit for scanning the surface of the photoreceptor by a laser beam, a light emitting diode array arranged so as to be opposed to the photoreceptor, and the like are applied as the light source for exposure.

A signal received from the telephone line through the network control section 17 is demodulated into a predetermined receiving code in the modulating/demodulating section 19. The receiving code is further subjected to decoding processing in the control section 7, so that image information is reproduced. The image information is applied to the recording section 3, thereby to perform a recording operation.

The environmental condition detecting section 11 for detecting the environmental conditions in the vicinity of the recording section 3 is for detecting the ambient temperature and the ambient humidity of the recording section 3. The results of the detection in the environmental condition detecting section 11 are used in judging processing as described later executed by the control section 7.

In the facsimile according to the present embodiment, it is possible to perform two types of receiving operations. Specifically, the first type of receiving operation is an operation for immediately-recording the received image on the paper sheets in the recording section 3. The second type of receiving operation is an operation for not recording the received image at the time of receiving but storing the same in the memory 5. The second type of receiving operation is referred to as representing receiving. The received image stored in the memory 5 is applied to the recording section 3, recorded on the paper sheets and outputted when a predetermined input operation is performed from the operating section 13 or when predetermined conditions judged by the control section 7 are satisfied.

An operation ensuring environment range which is a range of environmental conditions in which the recording operation in the recording section 3 can be satisfactorily performed is defined in the recording section 3. For example, it is ensured that the recording section 3 normally operates in the range of environmental conditions such as temperatures of 10° C. to 32.5° C. and humidity of 20% to 80%. Problems such as a paper jam and degradation of the image quality may occur due to condensation of toner, moisture absorption of the paper sheets and degradation of sensitivity of the photoreceptor under environmental conditions outside the operation ensuring environment range.

In the present embodiment, therefore, the first type of receiving operation is performed when the environmental conditions in the vicinity of the recording section 3 are within the operation ensuring environment range, while the second type of receiving operation is performed when the environmental conditions in the vicinity of the recording section 3 are outside the operation ensuring environment range. The second type of receiving operation is an operation only for electrically processing a signal; therefore, it can be satisfactorily performed, even if the environmental conditions in the vicinity of the facsimile change.

Figure 2:
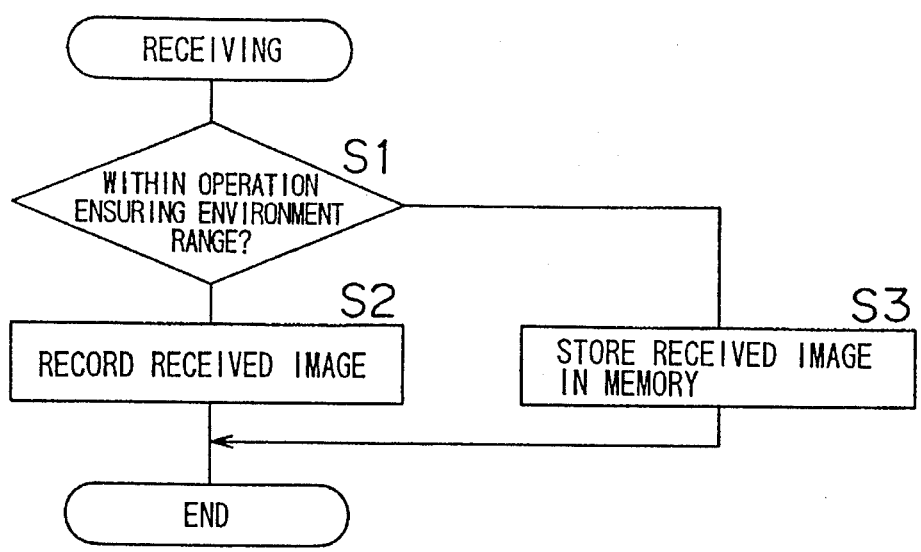
FIG. 2 is a flow chart for explaining a receiving operation.

FIG. 2 is a flow chart for explaining operations of the control section 7 at the time of receiving. If a signal from the facsimile on the other side of communication is received from the telephone line through the network control section 17, it is judged in the step S1 whether or not the environmental conditions in the vicinity of the recording section 3 are the environmental conditions within the operation ensuring environment range. This judgment is made by referring to the output of the environmental condition detecting section 11.

When the environmental conditions in the vicinity of the recording section 3 are within the operation ensuring environment range, the received image information is applied to the recording section 3. Consequently, in the recording section 3, the received image information is recorded on the paper sheets (step S2).

On the other hand, when it is judged that the environmental conditions in the vicinity of the recording section 3 are outside the operation ensuring environment range, the received image information is written into the memory 5 (step S3). In this case, the recording operation by the recording section 3 is inhibited.

Figure 3:
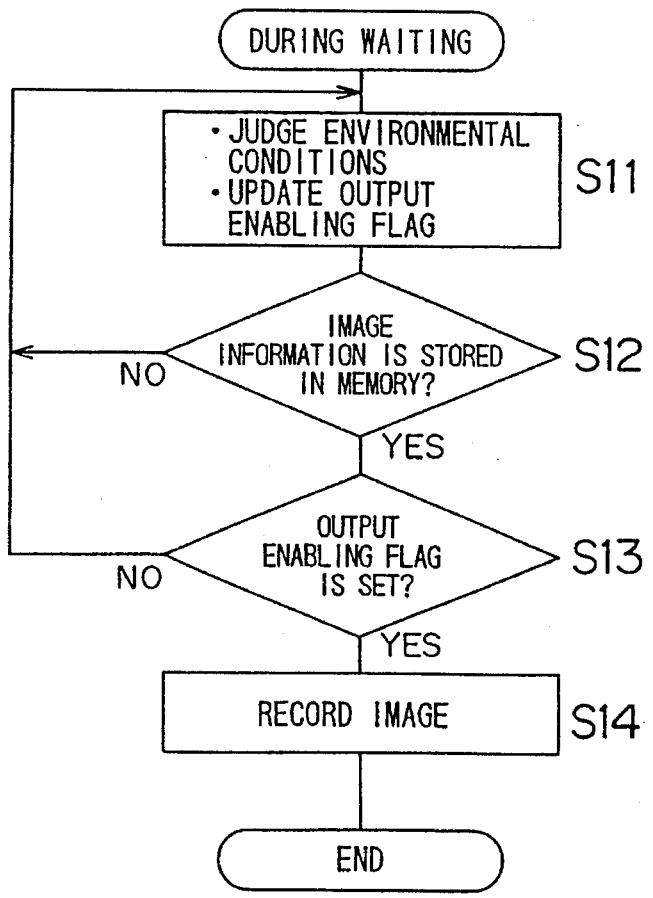
FIG. 3 is a flow chart for explaining operations performed while the facsimile is waiting for receiving.

FIG. 3 is a flow chart for explaining operations of the control section 7 performed while the facsimile is waiting for receiving. While the facsimile is waiting for receiving, the output of the environmental condition detecting section 11 is referred to, to judge whether or not the environmental conditions in the vicinity of the recording section 3 are within the operation ensuring environment range (step S11). The state of an output enabling flag indicating whether or not output of the image information stored in the memory 5 is enabled is updated on the basis of the results of the judgment. That is, the output enabling flag is set if the environmental conditions are within the operation ensuring environment range, while reset if they are outside the operation ensuring environment range.

In the step S12, it is examined whether or not image information is stored in the memory 5. If no image information is stored, the program is returned to the step S11. On the other hand, if image information is stored, the output enabling flag is referred to in the step S13. If the output enabling flag is set, the image information in the memory 5 is applied to the recording section 3, so that the received image information is recorded on the paper sheets (step S14). At this time, the contents stored in the memory 5 are cleared after the image information is recorded. On the other hand, when the output enabling flag is reset in the step S13, processing in the step S11 and the subsequent steps is repeated.

As described in the foregoing, according to the present embodiment, when the environmental conditions detected by the environmental condition detecting section 11 are outside the operation ensuring environment range, the recording operation by the recording section 3 is inhibited, so that the received image information is stored in the memory 5. The image information stored in the memory 5 is outputted at the time point where the environmental conditions are within the operation ensuring environment range. Consequently, no recording operation is performed under the environmental conditions outside the operation ensuring environment range. Accordingly, it is possible to prevent mechanical troubles such as a paper jam, degradation of the image quality, and the like. Therefore, the received image information can be reliably recorded on the paper sheets, thereby to make it possible to establish reliable information communication using the facsimile.

Although the embodiment of the present invention has been described and illustrated, the present invention is not limited to the above described embodiment. Various design changes can be made in the range in which the gist of the present invention is not modified.

To give an example, thermo-sensitive recording system for recording on thermosensible paper using thermal-head or ink-jet printer system, either may be employed for the image recording unit 3A. As a system for the image recording unit 3A is changed, the operation ensuring environment range should be changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus which receives image information and records the received image information on a paper sheet, comprising:

recording means for recording received image information on a paper sheet;

storing means for storing received image information;

environmental condition detecting means for detecting environmental condition in the vicinity of the facsimile apparatus; and control means for preventing the recording means from recording on a paper sheet the image information being received and causing the storing means to store the image information being received in response to the environmental condition detecting means detecting an environmental condition unsuitable for a recording operation by the recording means, which unsuitable condition has potential for causing a breakdown in the recording means or production of a poor quality recorded image, and wherein the image information being stored by said storing means is stored while under the environmental condition unsuitable for the recording operation; and wherein said control means causes the recording means to record the image information, which has been stored in the storing means under the environmental condition unsuitable for the recording operation, responsive to the environmental condition detecting means detecting a return to environmental conditions suitable for the recording operation by the recording means, and wherein said environmental condition detecting means comprises a temperature sensor and a humidity sensor, and said control means judges that the environmental conditions are suitable for an operation when the temperature detected by the temperature sensor is within a predetermined temperature range and, furthermore, that the humidity detected by the humidity sensor is within a predetermined humidity range, while judging that the environmental conditions are unsuitable for an operation when the temperature detected by the temperature sensor or the humidity detected by the humidity sensor is outside a corresponding one of said predetermined ranges.

2. The facsimile apparatus according to claim 1 wherein said temperature range is 10° C. to 32.5° C. and said humidity range is 20% to 80%.

3. The facsimile apparatus according to claim 1, wherein said recording means records with an electrophotographic process.

4. The facsimile apparatus according to claim 3, wherein said environmental condition detecting means detects the environmental conditions in the vicinity of the recording means.

5. The facsimile apparatus according to claim 1 wherein said control means sets a recognition enabling flag if both the sensed temperature and humidity fall within the corresponding ranges, and wherein said control means repeatedly cycles through a first step to determine if image information is in memory and, if so, then a second step to check whether a recordation enabling flag has been set and, if so, causes said recording means to record the image information.

6. The facsimile apparatus according to claim 1 wherein the image information stored by said storing means is recorded by said recording means when either a predetermined input operation is performed from an operating section of said facsimile apparatus, which operating section is in communication with said control means, or when said environmental detecting means detects a return to an environment suitable for the recording operation by the recording means.

7. The facsimile apparatus according to claim 1 wherein said environmental condition detecting means comprises an ambient temperature detecting device for detecting ambient temperature in the vicinity of the recording means and an ambient humidity detection device for detecting ambient humidity in the vicinity of the recording means.

8. The facsimile apparatus according to claim 1 wherein suitable for operation humidity and temperature ranges are defined in said recording means which is in communication with said control means.

* * * * *